United States Patent
Gablenko

[11] Patent Number: 6,033,539
[45] Date of Patent: Mar. 7, 2000

[54] UNITS FOR ELECTRO-CHEMICAL SYNTHESIS OF WATER SOLUTION

[76] Inventor: Viacheslav G. Gablenko, Tverskaya str., 9, box 157, 141980 Dubna, Russian Federation

[21] Appl. No.: 09/138,055

[22] Filed: Aug. 21, 1998

[51] Int. Cl.[7] ....................................................... C25B 9/00
[52] U.S. Cl. .................. 204/260; 204/228.3; 204/229.8; 204/253; 204/257; 204/263
[58] Field of Search ................................. 204/401, 228.3, 204/229.8, 229.9, 244, 245, 253, 257, 260, 263

[56] References Cited

U.S. PATENT DOCUMENTS

| | | | |
|---|---|---|---|
| 4,676,882 | 6/1987 | Okazaki | 204/260 |
| 4,867,856 | 9/1989 | Okazaki | 204/260 |
| 5,427,667 | 6/1995 | Bakhir et al. | 204/260 |
| 5,624,544 | 4/1997 | Deguchi et al. | 204/260 |
| 5,628,888 | 5/1997 | Bakhir et al. | 204/260 |
| 5,635,040 | 6/1997 | Bakhir et al. | 204/260 |
| 5,783,052 | 7/1998 | Bakhir et al. | 204/260 |
| 5,871,623 | 2/1999 | Bakhir et al. | 204/260 |

*Primary Examiner*—Bruce F. Bell
*Attorney, Agent, or Firm*—John Edward Roethel

[57] ABSTRACT

An electrochemical cell unit contains one or a plurality of electrochemical cells which are interconnected for the flow of solutions therethrough. Each electrochemical cell comprises an outer hollow tubular anode electrode and a central core tubular cathode electrode. Mounted coaxially between the outer hollow tubular anode electrode and the central core tubular cathode electrode is a hollow tubular diaphragm. A lower head assembly also includes inlet passageways for bringing solution into the anode chamber and the cathode chamber. An upper head assembly also includes outlet passageways for removing treated solution from the anode chamber and the cathode chamber. At the lower end of the electrochemical cell housing and underneath the lower head assembly, there is provided a collection container which can be in the shape of a box with a centrally depressed area for water accumulation. Located in the interior of this box is a sensor system which transfers information to a controller that moisture is present in the box. The sensor system includes mounted in the interior of the box a pair of parallel sensor electrodes designed to detect the presence of moisture leaking from the bottom of the electrochemical cell. Each sensor electrode is connected to a signal system to alert the user that the electrochemical cell is broken and not functioning.

1 Claim, 4 Drawing Sheets

UNITS FOR ELECTRO-CHEMICAL SYNTHESIS OF WATER SOLUTION

This invention relates to electrochemical technology and can be used for the electrochemical synthesis of water. The present invention can be used in those processes associated with the electrochemical treatment of an acid solution into an alkaline solution of oxidants which then has the characteristics of active water. More particularly the present invention includes one or more electrochemical cells each of which are provided with a collector container having sensor electrodes therein at the lower end of each electrochemical cell for detecting moisture or leakage when the cell is defective and the sensor electrodes are connected to a control system to automatically alert the user in the event of a failure of the electrochemical cell.

BACKGROUND OF THE INVENTION

In the field of applied electrochemical technology, an electrolyzer is traditionally used for processing water and differing construction of electrolyzers are used to create different acid or alkaline solutions.

A previously known unit for the electrolysis of water comprises an electrical electrolyzer that has a pair of coaxially disposed electrodes with a membrane positioned therebetween creating an anode chamber and a cathode chamber. The anode chamber of the electrolyzer has an inlet into its lower portion and an outlet from its upper portion and the cathode chamber of the electrolyzer has an inlet into its lower portion and an outlet from its upper portion, the inlet and outlet of the anode chamber being separate from the inlet and outlet of the cathode chamber. Each of the anode chamber and the cathode chamber conducts fluid therethrough with the fluid being introduced into the electrolyzer from a hydraulic source connected to the electrolyzer. This unit includes a power source of constant current which connects with the electrolyzer through a commutation junction. A deficiency of this device is that its construction is relatively difficult and this device does not include an indicator that can be used as a quick diagnostic tool that will announce when a problem exists in the fluid level within the anode chamber.

Another previously known device that is similar to the present invention is a unit that accomplishes the electrochemical synthesis of water. This unit has an electro-reactor inside the electrochemical cells. Each electrochemical cell consists of a pair of vertical electrodes mounted coaxially with a ceramic micro filtration membrane positioned between the coaxial electrodes. The cells are provided with a dielectric collector which is provided with an opening for the inlet and outlet of the water being processed. This unit uses a power source of constant current. The deficiency of this unit is that it does not have a diagnostic device that can detect the destruction of the bridge of the anode or that can detect a failure of the level of solution in the anode chamber. Therefore any failure of the device that goes undetected will result in the processing of a solution that will not be good quality because any break or failure of the anode will interrupt the processing of the solution because oxides from the coating of the anode will break off and be introduced into the solution being processed.

It is an object of the present invention to provide an apparatus that is capable of generating a signal automatically in response to a failure of the anode of the electrochemical cell. It is also an object of the present invention to simplify the construction of the electrochemical cells.

It is a feature of the present invention to provide an electrochemical cell for the electrochemical synthesis of water or a water solution which includes a central hollow core anode that is provided at the lower end of the anode chamber with a collection container having a pair of parallel conductor electrodes that sense the presence of moisture leaking from the anode. When moisture is detected by the electrodes, a signal is generated to announce that there is a failure in the electrochemical cell.

It is an advantage that the present invention makes a valuable contribution to electrochemical technology because there can be no commercial exploitation of an electrochemical cell which is broken and not functioning.

Other objects, features and advantages of the present invention will become apparent from a consideration of the following detailed description.

SUMMARY OF THE INVENTION

An electrochemical cell unit contains one or a plurality of electrochemical cells which are interconnected for the flow of solutions therethrough. Each electrochemical cell comprises an outer hollow tubular anode electrode and a central core tubular cathode electrode. Mounted coaxially between the outer hollow tubular anode electrode and the central core tubular cathode electrode is a hollow tubular diaphragm.

The upper ends of the anode electrode, the tubular diaphragm and the cathode electrode are connected by means of an upper head assembly made of dielectric material. The lower ends of the anode electrode, the tubular diaphragm and the cathode electrode are connected by means of a lower head assembly made from dielectric material. The lower head assembly also includes inlet passageways for bringing solution into the anode chamber and the cathode chamber. The upper head assembly also includes outlet passageways for removing treated solution from the anode chamber and the cathode chamber.

At the lower end of the electrochemical cell housing and underneath the lower head assembly, there is provided a collection container which can be in the shape of a box with a centrally depressed area for water accumulation. Located in the interior of this box is a sensor system which transfers information to a controller that moisture is present in the box.

The sensor system includes mounted in the interior of the box a pair of parallel sensor electrodes designed to detect the presence of moisture leaking from the bottom of the electrochemical cell. Each sensor electrode is connected to a signal system to alert the user that the electrochemical cell is broken and not functioning.

DETAILED DESCRIPTION OF THE PREFERRED EMBODIMENTS

Figure 1:
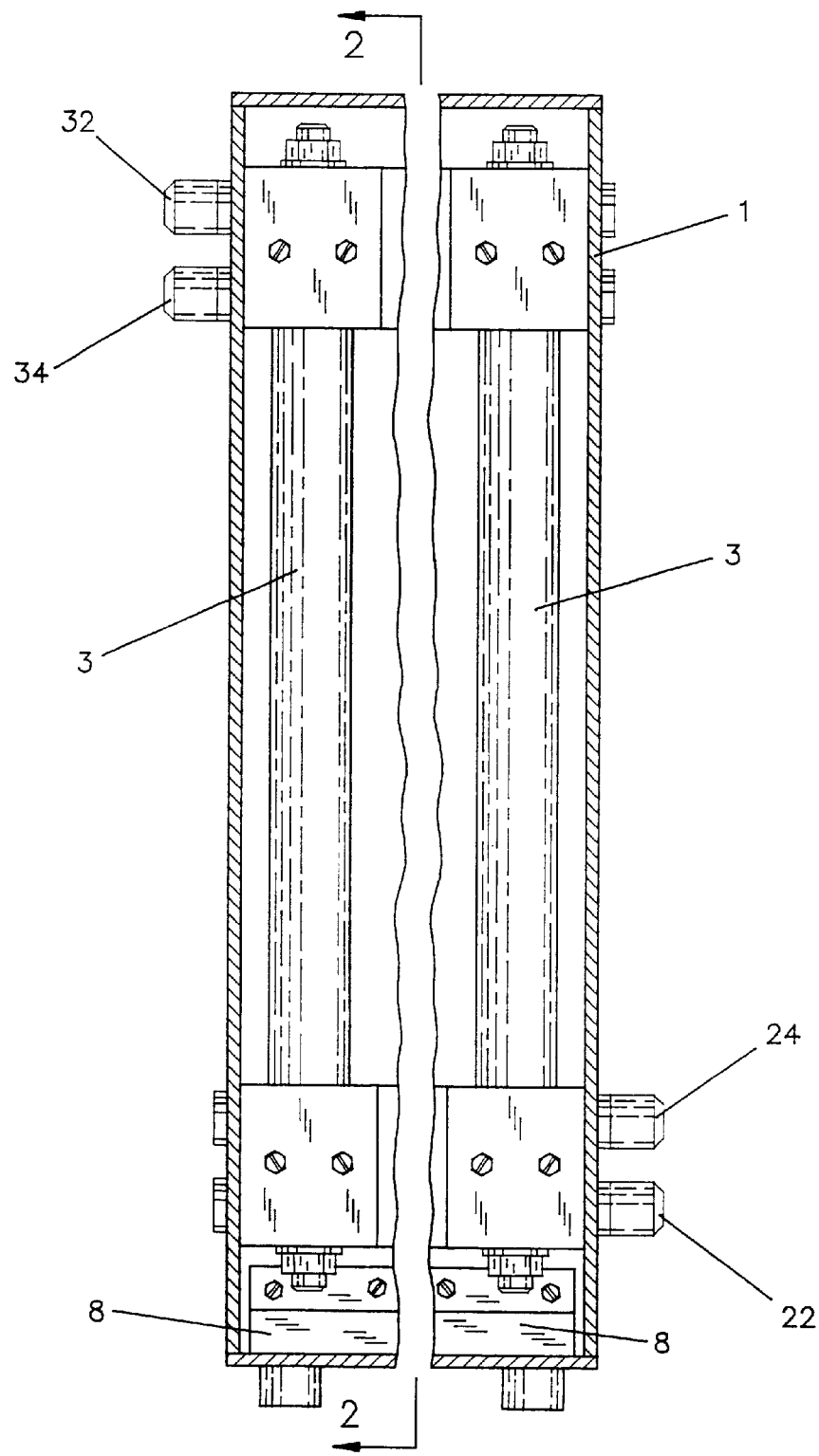
FIG. 1 shows a front cross sectional view of the general construction of the electrochemical cell unit of the present invention.
Figure 2:
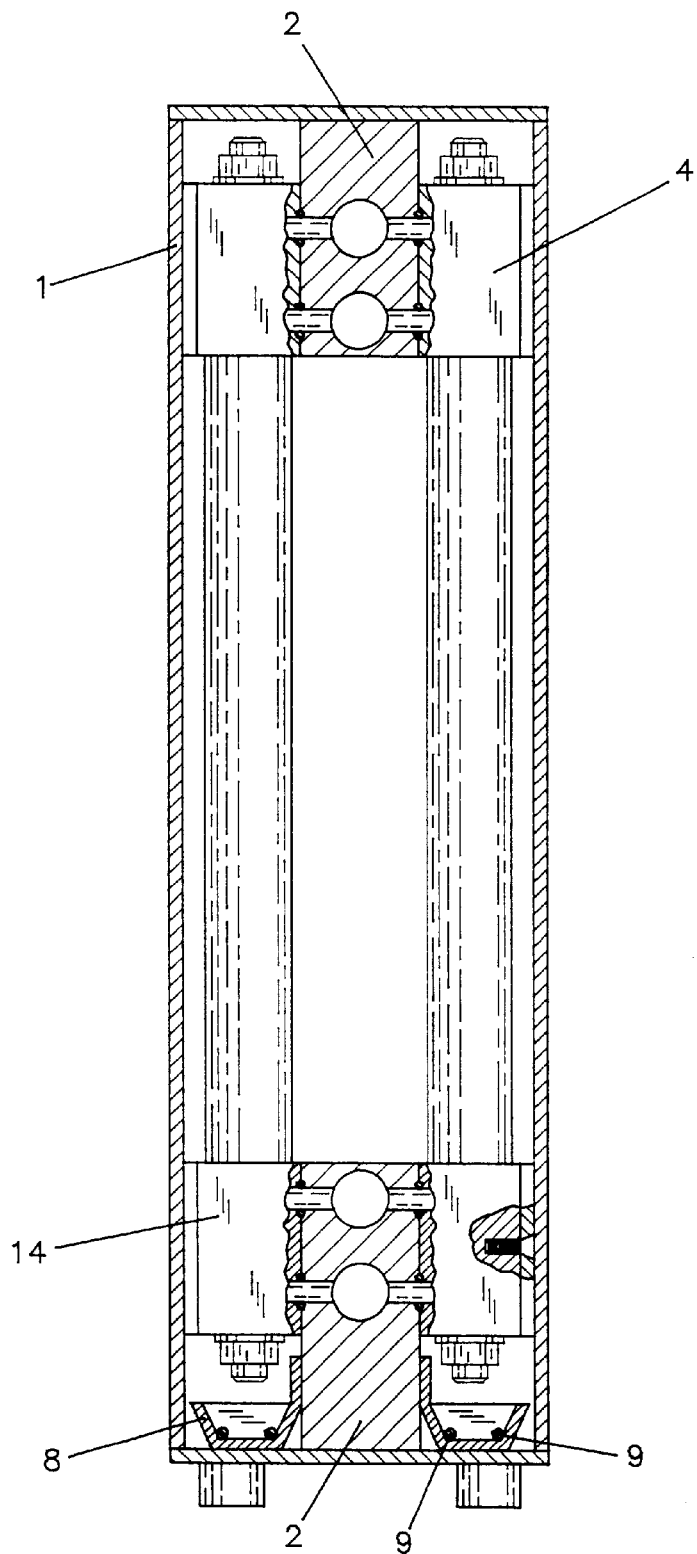
FIG. 2 shows a side cross sectional view of the general construction of the present invention taken along line A—A of FIG. 1.
Figure 3:
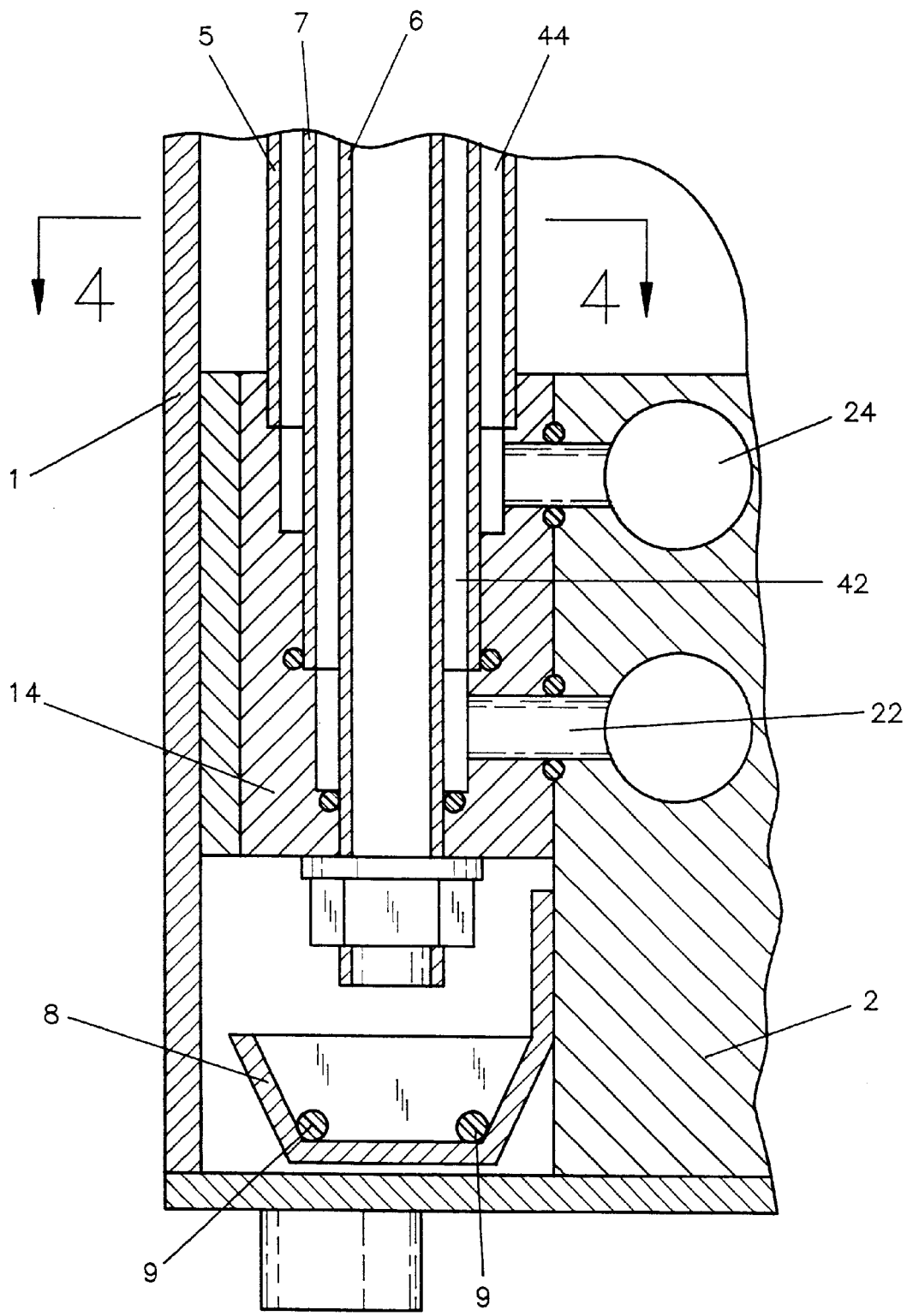
FIG. 3 shows a detailed front cross sectional view of a portion of the apparatus of the present invention.
Figure 4:
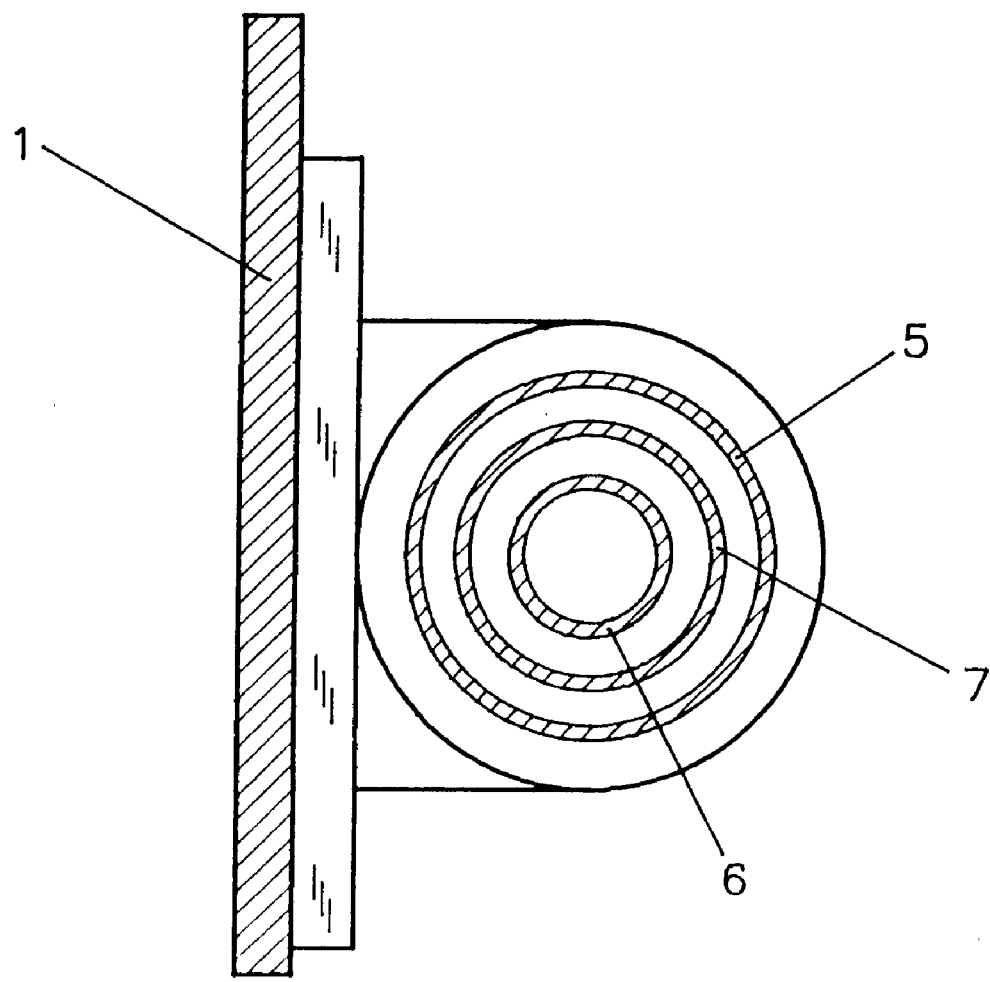
FIG. 4 shows a detailed side cross sectional view of a portion of the apparatus of the present invention taken along line B—B of FIG. 3.

The electrochemical cell unit of the present invention is shown in FIGS. 1–4. The electrochemical cell unit comprises a housing 1. The housing 1 contains a plurality of electrochemical cells 3 which are interconnected for the flow of solutions therethrough by means of collectors 2 which are made from dielectric material. Each electrochemical cell 3 comprises an outer hollow tubular anode electrode 5, identical in length in each section, and a central core tubular cathode electrode 6. Mounted coaxially between the outer hollow tubular anode electrode 5 and the central core tubular cathode electrode 6 is a hollow tubular diaphragm 7 which is a ceramic diaphragm membrane. An anode chamber 42 is created between the anode electrode 5 and the tubular diaphragm 7. A cathode chamber is created between the tubular diaphragm 7 and the cathode electrode 6.

The upper ends of the anode electrode 5, the tubular diaphragm 7 and the cathode electrode 6 are connected by means of an upper head assembly 4 made of dielectric material. The lower ends of the anode electrode 5, the tubular diaphragm 7 and the cathode electrode 6 are connected by means of a lower head assembly 14 made from dielectric material. The lower head assembly 14 also includes inlet passageways 22, 24 for bringing solution into the anode chamber and the cathode chamber. The upper head assembly 4 also includes outlet passageways 32, 34 for removing treated solution from the anode chamber and the cathode chamber.

At the lower end of the electrochemical cell housing 10 and underneath the lower head assembly 14, there is provided a collection container 8 which can be in the shape of a box with a centrally depressed area for water accumulation. Located in the interior of this box is a sensor system which transfers information to a controller that moisture is present in the box.

The sensor system includes, mounted in the interior of the box, a pair of parallel sensor electrodes 9. The sensor electrodes 9 are designed to detect the presence of moisture leaking from the bottom of the electrochemical cell. Each sensor electrode 9 is connected to a signal system (not shown) and each sensor electrode 9 is connected by means of a collector clip 10, the collector clip 10 being associated with the collection container 8.

The anode electrode 5, the cathode electrode 6 and the sensor electrodes 9 are connected to a power source of constant electrical current.

In operation, if there is a failure or defect in the operation or manufacture of the protected anode which causes the anode to begin leaking solution out of the lower end of the lower head assembly 14, the presence of the moisture leaking from the lower head assembly will be detected by one or both of the sensor electrodes 9. For example, an anode made from titanium with oxirutanium may have a defective wall surface so that the solution being treated by the anode may leak out of the anode chamber and accumulate in collection container 8. Upon detection of this leakage by the sensor electrodes 9, a signal is sent by the sensor electrodes through a signal system (not shown) which notifies that a breach of the electrochemical cell has occurred.

There is no comparable system which incorporates a detection system which signals the malfunction of an electrochemical cell. The present invention makes a valuable contribution to electrochemical technology because there can be no commercial exploitation of an electrochemical cell which is broken and not functioning.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. An electrochemical cell unit comprising:
   a) a housing containing at least one electrochemical cell comprising an outer hollow tubular anode electrode, a central core tubular cathode electrode and a hollow tubular diaphragm mounted coaxially between the tubular anode electrode and the tubular cathode electrode;
   b) the anode electrode, the tubular diaphragm and the cathode electrode being connected at a lower end thereof to a lower head assembly, the lower head assembly including an inlet passageways for introducing a solution to be treated to the anode electrode and the cathode electrode; and
   c) a collection container positioned at a lower end of the electrochemical cell housing and underneath the lower head assembly, the collection container including a pair of parallel sensor electrodes, each sensor electrode being connected to a signal system whereby when the sensor electrode detects the presence of moisture leaking from the bottom of the electrochemical cell, a signal is sent to alert the user that the electrochemical cell is broken and not functioning.

* * * * *